US012680897B2

(12) United States Patent
Wakabayashi

(10) Patent No.: US 12,680,897 B2
(45) Date of Patent: Jul. 14, 2026

(54) TORQUE SENSOR

(71) Applicant: FANUC CORPORATION, Yamanashi (JP)

(72) Inventor: Kazuki Wakabayashi, Yamanashi (JP)

(73) Assignee: FANUC CORPORATION, Yamanashi (JP), jp ( * ) Notice: Subject to any disclaimer, the term of this patent is extended or adjusted under 35 U.S.C. 154(b) by 301 days.

(21) Appl. No.: 18/567,277

(22) PCT Filed: Jun. 30, 2021

(86) PCT No.: PCT/JP2021/024717
§ 371 (c)(1),
(2) Date: Dec. 5, 2023

(87) PCT Pub. No.: WO2023/276035
PCT Pub. Date: Jan. 5, 2023

(65) Prior Publication Data
US 2024/0264020 A1 Aug. 8, 2024

(51) Int. Cl.
*G01L 5/1627* (2020.01)
(52) U.S. Cl.
CPC .................................. *G01L 5/1627* (2020.01)
(58) Field of Classification Search
CPC .................................................... G01L 5/1627
See application file for complete search history.

(56) References Cited

U.S. PATENT DOCUMENTS 4,911,023 A * 3/1990 Izumi ..................... G01L 1/2231
73/862.044
9,448,128 B2 * 9/2016 Kim ...................... G01L 5/1627
(Continued)

FOREIGN PATENT DOCUMENTS

| CN | 106768522 A | 5/2017 |
| CN | 107063517 A | 8/2017 |
(Continued)

OTHER PUBLICATIONS

International Search Report dated Aug. 10, 2021, for International Patent Application No. PCT/JP2021/024717.
(Continued)

*Primary Examiner* — Octavia Hollington
(74) *Attorney, Agent, or Firm* — KARCESKI IP LAW, PLLC

(57) ABSTRACT

This torque sensor includes: an outer circumferential part and an inner circumferential part that have an annular shape and are disposed concentrically with a gap therebetween in the radial direction thereof; a plurality of double-supported beam-like connecting beam parts that are disposed with gaps therebetween in the circumferential direction and connect the outer circumferential part and the inner circumferential part; and detecting parts that detect the torque applied about a central axis to the outer circumferential part and the inner circumferential part, wherein both side surfaces of the connecting beam parts in the circumferential direction have concave curved shapes the respective radii of curvature of which gradually increase from the inner circumferential surface of the outer circumferential part and the outer circumferential surface of the inner circumferential part toward the center in the length direction of the connecting beam parts when seen in the direction of the central axis.

4 Claims, 16 Drawing Sheets

(56)  References Cited

U.S. PATENT DOCUMENTS

| | | | |
|---|---|---|---|
| 2015/0135856 A1 | 5/2015 | Kim et al. | |
| 2019/0204169 A1 | 7/2019 | Haehnle et al. | |

FOREIGN PATENT DOCUMENTS

| | | | | | |
|---|---|---|---|---|---|
| CN | 107850502 | A | | 3/2018 | |
| CN | 108375435 | A | | 8/2018 | |
| CN | 112665765 | A | | 4/2021 | |
| CN | 112747854 | A | | 5/2021 | |
| CN | 113008428 | A | | 6/2021 | |
| JP | S5969541 | A | | 4/1984 | |
| JP | S6321531 | A | | 1/1988 | |
| JP | 2017172983 | A | * | 9/2017 | ........... G01L 5/0061 |
| JP | 2017203645 | A | | 11/2017 | |
| JP | 2019526800 | A | | 9/2019 | |
| JP | 2020008323 | A | | 1/2020 | |
| JP | 2020008324 | A | | 1/2020 | |
| JP | 6727605 | B1 | | 7/2020 | |
| JP | 2021025956 | A | * | 2/2021 | |
| KR | 102072492 | B1 | * | 2/2020 | ............ G01L 3/108 |
| WO | 2019059284 | A1 | | 3/2019 | |

OTHER PUBLICATIONS

Taiwanese Office Action dated Mar. 25, 2025, for Taiwanese Patent Application No. 111122301.
Chinese Office Action dated Mar. 18, 2026, for Chinese Patent Application No. 202180098795.2.

* cited by examiner

FIG. 13

TORQUE SENSOR

CROSS-REFERENCE TO RELATED APPLICATION(S)

This is a National Stage Entry into the United States Patent and Trademark Office from International Patent Application No. PCT/JP2021/024717, filed on Jun. 30, 2021, the entire contents of which is incorporated herein by reference.

FIELD OF THE INVENTION

The present disclosure relates to torque sensors.

BACKGROUND OF THE INVENTION

A known measuring device in the related art includes an annular outer circumferential part, an annular inner circumferential part disposed radially inward of the outer circumferential part, and an annular intermediate part disposed between the outer circumferential part and the inner circumferential part (e.g., see Japanese Unexamined Patent Application Publication No. 2021-25956).

The intermediate part is provided with a plurality of long-hole-like rigid adjustment holes extending in the circumferential direction and arranged evenly in the circumferential direction. Accordingly, a plurality of double-supported beam parts that connect the outer circumferential part and the inner circumferential part to each other in the radial direction are provided between adjacent rigid adjustment holes and are arranged with a distance therebetween in the circumferential direction. A strain gauge is bonded to the center position of each double-supported beam part in the radial direction, thereby forming a measuring device that measures torque.

SUMMARY OF THE INVENTION

An aspect of the present disclosure provides a torque sensor including: an annular outer circumferential part and an annular inner circumferential part that are disposed concentrically with a gap therebetween in a radial direction; a plurality of double-supported-beam-like connecting beam parts disposed with a gap therebetween in a circumferential direction and connecting the outer circumferential part and the inner circumferential part to each other; and a detecting part that detects torque applied around a center axis between the outer circumferential part and the inner circumferential part. When viewed from a direction of the center axis, opposite side surfaces of each connecting beam part in the circumferential direction each have a concave curved shape with a radius of curvature that gradually increases from an inner circumferential surface of the outer circumferential part and an outer circumferential surface of the inner circumferential part toward a center in a length direction of the connecting beam part.

BRIEF DESCRIPTION OF THE DRAWINGS

FIG. 13 is a graph illustrating the contour shape (minor axis $R=R_2$) of the opposite side surfaces of the connecting beam part in FIG. 2 and the ratio between the rate of change in the maximum stress value and the rate of change in the amount of deformation.

DESCRIPTION OF EMBODIMENT(S) OF THE INVENTION

A torque sensor 1 according to an embodiment of the present disclosure will be described below with reference to the drawings.

The torque sensor 1 according to this embodiment includes a sensor body 10 formed by punching a metallic flat plate having a fixed thickness in the thickness direction thereof, and strain gauges (detecting parts) 20 attached to the sensor body 10.

Figure 1:
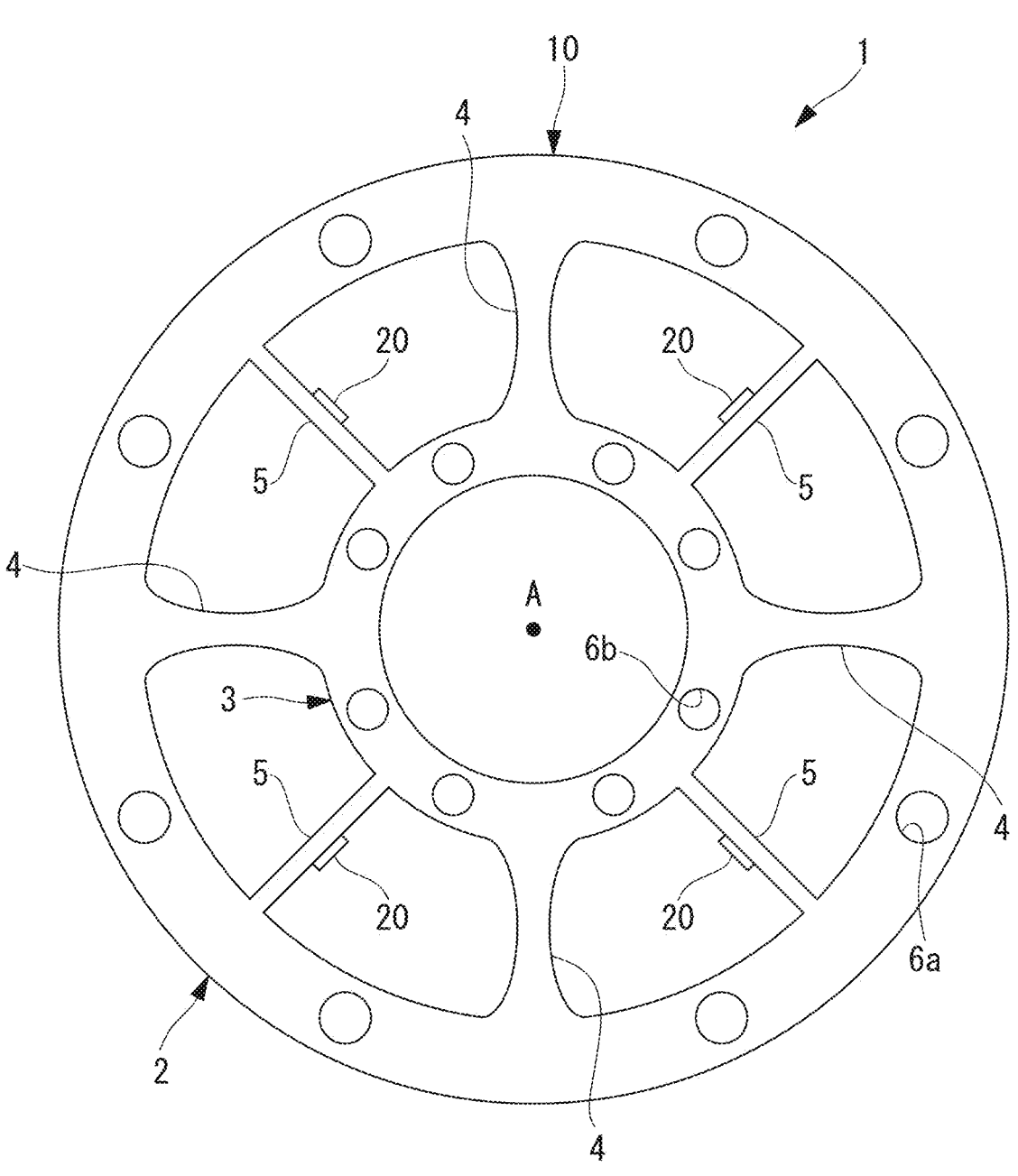
FIG. 1 is a plan view illustrating a torque sensor according to an embodiment of the present disclosure.

As shown in FIG. 1, the sensor body 10 includes an annular outer circumferential part 2 centered on an axis (center axis) A and an annular inner circumferential part 3 disposed radially inward of the outer circumferential part 2 and concentrically therewith with a gap therebetween. The sensor body 10 includes a plurality of, such as four, connecting beam parts 4 and a plurality of, such as four, detecting beam parts 5 (detecting parts) in an annular gap between the outer circumferential part 2 and the inner circumferential part 3. The connecting beam parts 4 and the detecting beam parts 5 are arranged evenly in the circumferential direction around the axis A and connect the outer circumferential part 2 and the inner circumferential part 3 to each other in the radial direction in a double-supported-beam-like fashion.

The outer circumferential part 2 is provided with a plurality of through-holes 6a extending therethrough in the thickness direction and arranged with a distance therebetween in the circumferential direction. The inner circumferential part 3 is provided with a plurality of threaded holes 6b extending therethrough in the thickness direction and arranged with a distance therebetween in the circumferential direction.

Figure 2:
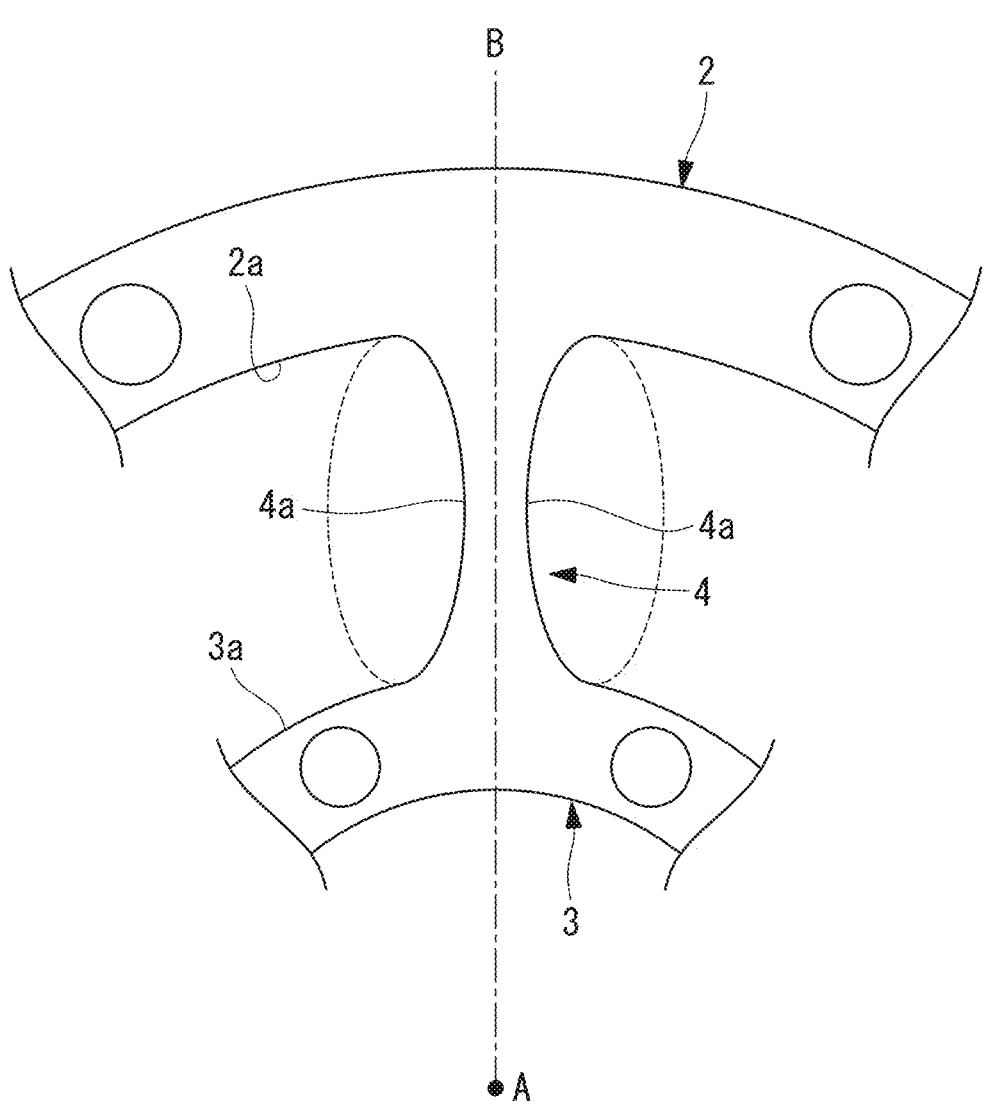
FIG. 2 is a partially enlarged view illustrating a connecting beam part of the torque sensor in FIG. 1.

As shown in FIG. 2, each connecting beam part 4 has a longitudinal axis B extending in the radial direction along a line extending through the axis A. One end of the connecting beam part 4 in the direction of the longitudinal axis B is connected to an inner circumferential surface 2a of the outer circumferential part 2, whereas the other end is connected to an outer circumferential surface 3a of the inner circumferential part 3.

Opposite side surfaces 4a of each connecting beam part 4 in the circumferential direction around the axis A have contour shapes that are line-symmetric with respect to the longitudinal axis B when viewed from the direction of the axis A. The contour shape of each side surface 4a has a concaved curve of an elliptical arc corresponding to half of an ellipse with its major axis disposed parallel to the longitudinal axis B. The major axis of the elliptical arc has the same length as the gap between the inner circumferential surface 2a of the outer circumferential part 2 and the outer circumferential surface 3a of the inner circumferential part 3 in the radial direction.

Accordingly, each side surface 4a has a curved shape whose radius of curvature gradually increases from the opposite ends in the direction of the longitudinal axis B toward the center.

Each detecting beam part 5 is disposed between a corresponding pair of connecting beam parts 4 adjacent each other in the circumferential direction and connects the outer circumferential part 2 and the inner circumferential part 3 to each other in the radial direction. The detecting beam part 5 has a cross-sectional area that is sufficiently smaller than the cross-sectional area of each connecting beam part 4, and has a shape that makes the detecting beam part 5 easily deformable when torque is applied in the circumferential direction between the outer circumferential part 2 and the inner circumferential part 3. Accordingly, the connecting beam parts 4 are mainly responsible for the strength of the torque sensor 1, whereas the detecting beam parts 5 do not have an effect on the strength of the torque sensor 1.

Each strain gauge 20 is bonded to the surface of the corresponding detecting beam part 5. Each strain gauge 20 is a thin-film-like resistance element and changes in resistance value in response to deformation of the detecting beam part 5 to which the strain gauge 20 is bonded.

Each strain gauge 20 constitutes a bridge circuit (not shown) and detects a change in the resistance value as a change in voltage.

The operation of the torque sensor 1 according to this embodiment having the above-described configuration will be described below.

Figure 3:
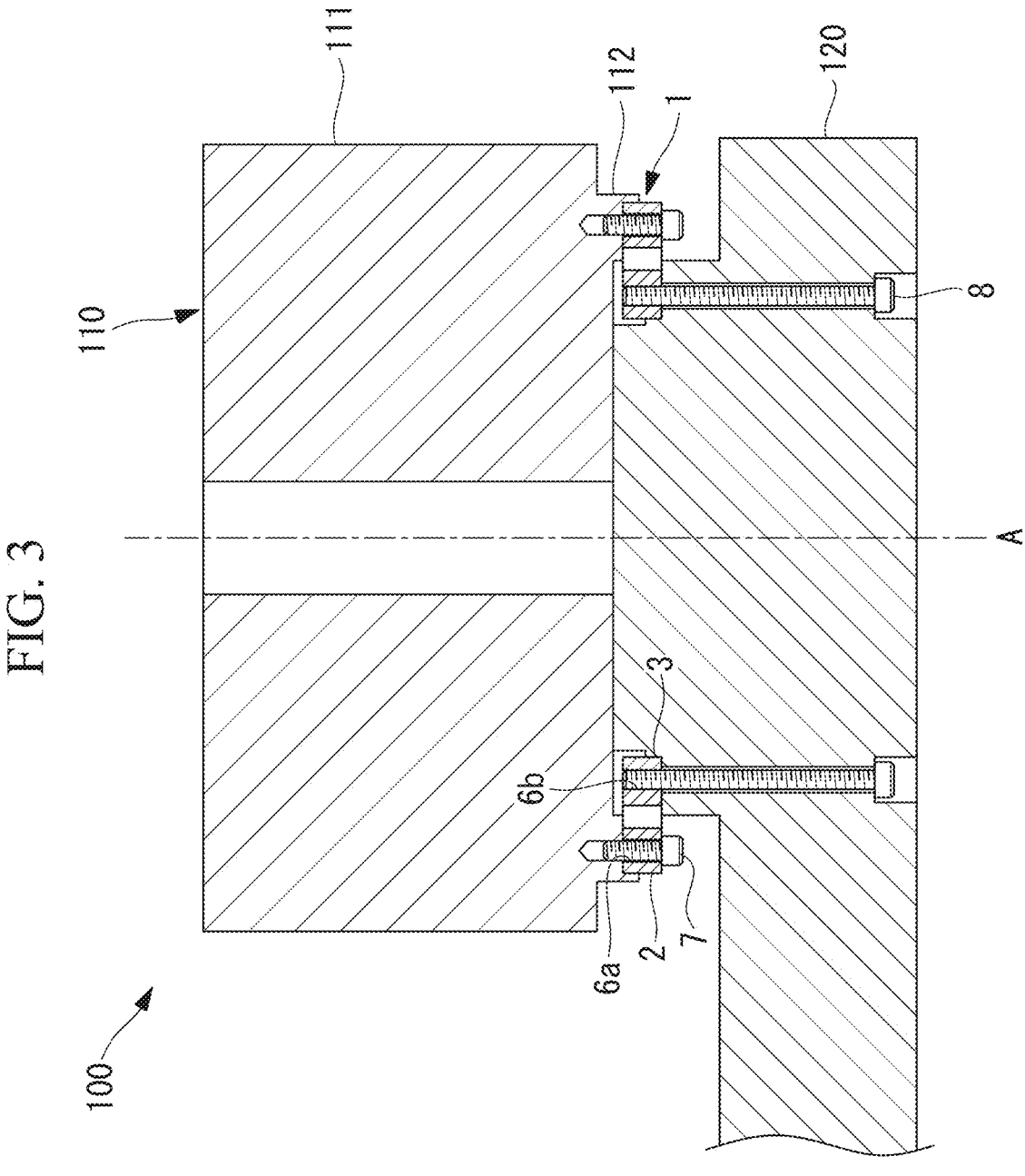
FIG. 3 illustrates an example where the torque sensor in FIG. 1 is attached to a joint of a robot.

As shown in FIG. 3, for example, the torque sensor 1 is attached to a joint 100 of a robot and is used for detecting torque output by an actuator 110 provided at the joint 100.

In the example shown in FIG. 3, the torque sensor 1 is attached between an output shaft 112 of a speed reducer 111 constituting the actuator 110 of the joint 100 of the robot and a robot arm 120 fixed to the output shaft 112, such that the axis A is aligned with a rotation axis of the output shaft 112. In particular, the outer circumferential part 2 is fixed to the output shaft 112 of the speed reducer 111 by using bolts 7 extending through the through-holes 6a, and the inner circumferential part 3 is fixed to the robot arm 120 by using bolts 8 fastened to the threaded holes 6b in the inner circumferential part 3.

Accordingly, the torque sensor 1 is directly fixed between the speed reducer 111 serving as an object to be detected and the robot arm 120.

In this state, when the output shaft 112 of the speed reducer 111 rotates around the axis A, torque acts in the circumferential direction around the axis A between the outer circumferential part 2 and the inner circumferential part 3, thus causing the outer circumferential part 2 and the inner circumferential part 3 to relatively shift slightly in the circumferential direction. The slight shifting of the outer circumferential part 2 and the inner circumferential part 3 causes the detecting beam parts 5 to deform.

Accordingly, the strain gauges 20 bonded to the detecting beam parts 5 detect a voltage value according to the amount of deformation of the detecting beam parts 5, so that the magnitude of the torque occurring in accordance with the rotation of the output shaft 112 of the speed reducer 111 can be detected.

In this case, when the torque acts around the axis A between the outer circumferential part 2 and the inner circumferential part 3, stress occurs in the connecting beam parts 4 that connect the outer circumferential part 2 and the inner circumferential part 3 to each other. In particular, larger stress occurs at the opposite ends of each connecting beam part 4 in the direction of the longitudinal axis B. On the other hand, stress hardly occurs near the center in the direction of the longitudinal axis B.

The following description relates to the relationship that the shape of each side surface 4a of the connecting beam part 4 has with the magnitude of stress occurring in the connecting beam part 4 and the deformability of the connecting beam part 4.

Figure 4:
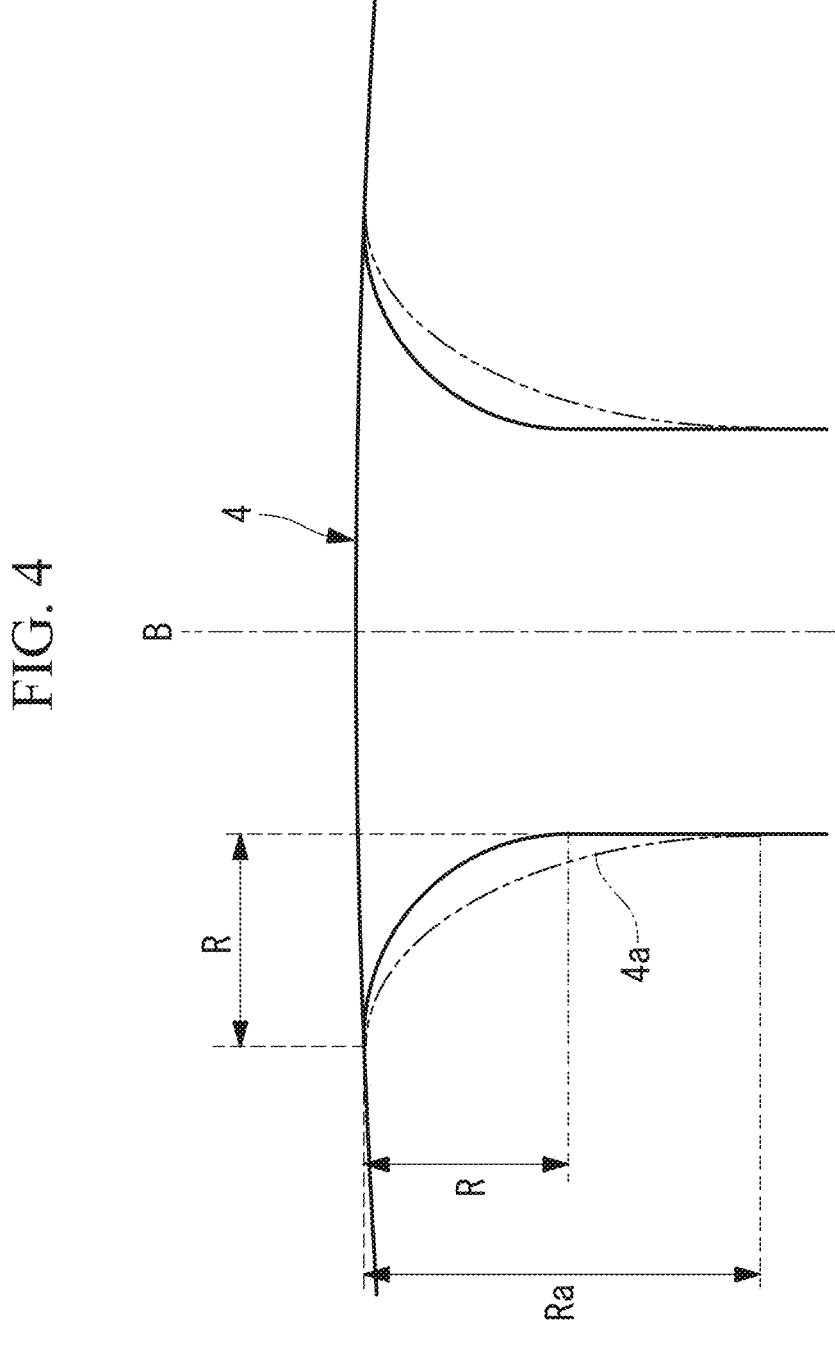
FIG. 4 illustrates a part of an analytical model in a case where opposite side surfaces of the connecting beam part in FIG. 2 have an elliptical-arc contour shape.
Figure 5:
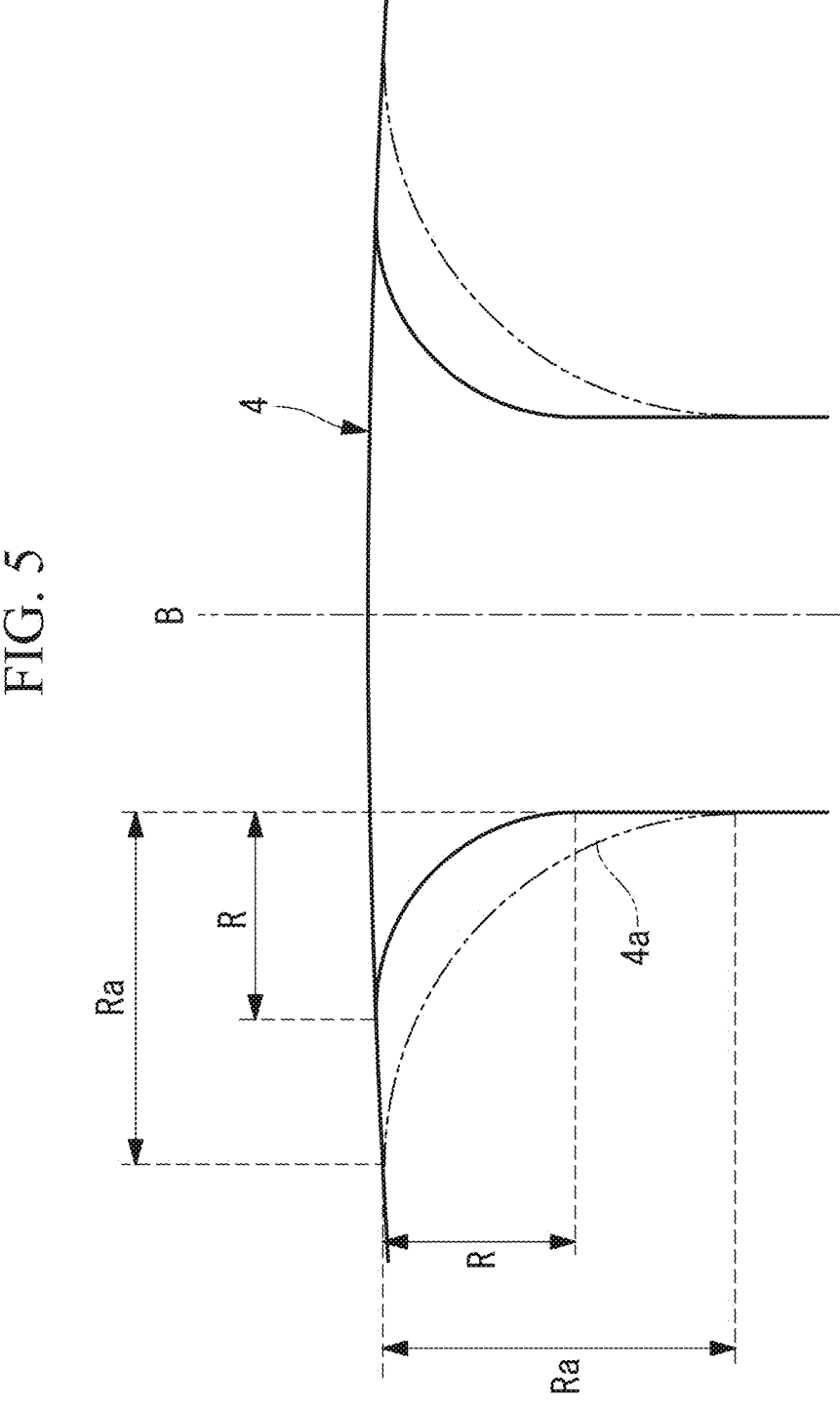
FIG. 5 illustrates a part of an analytical model in a case where the opposite side surfaces of the connecting beam part in FIG. 2 have a circular-arc contour shape.

FIG. 4 illustrates a part of an analytical model in a case where the opposite side surfaces 4a of each connecting beam part 4 at one end thereof in the direction of the longitudinal axis B have an elliptical-arc contour shape when viewed from the direction of the axis A. FIG. 5 illustrates a part of an analytical model in a case where the elliptical arc in FIG. 4 is replaced with a circular arc. For each of the analytical models, a maximum stress value and an amount of deformation occurring in each connecting beam part 4 when a fixed force in the circumferential direction is applied to the other end of the connecting beam part 4 in the direction of the longitudinal axis B were calculated.

5

6

Figure 6:
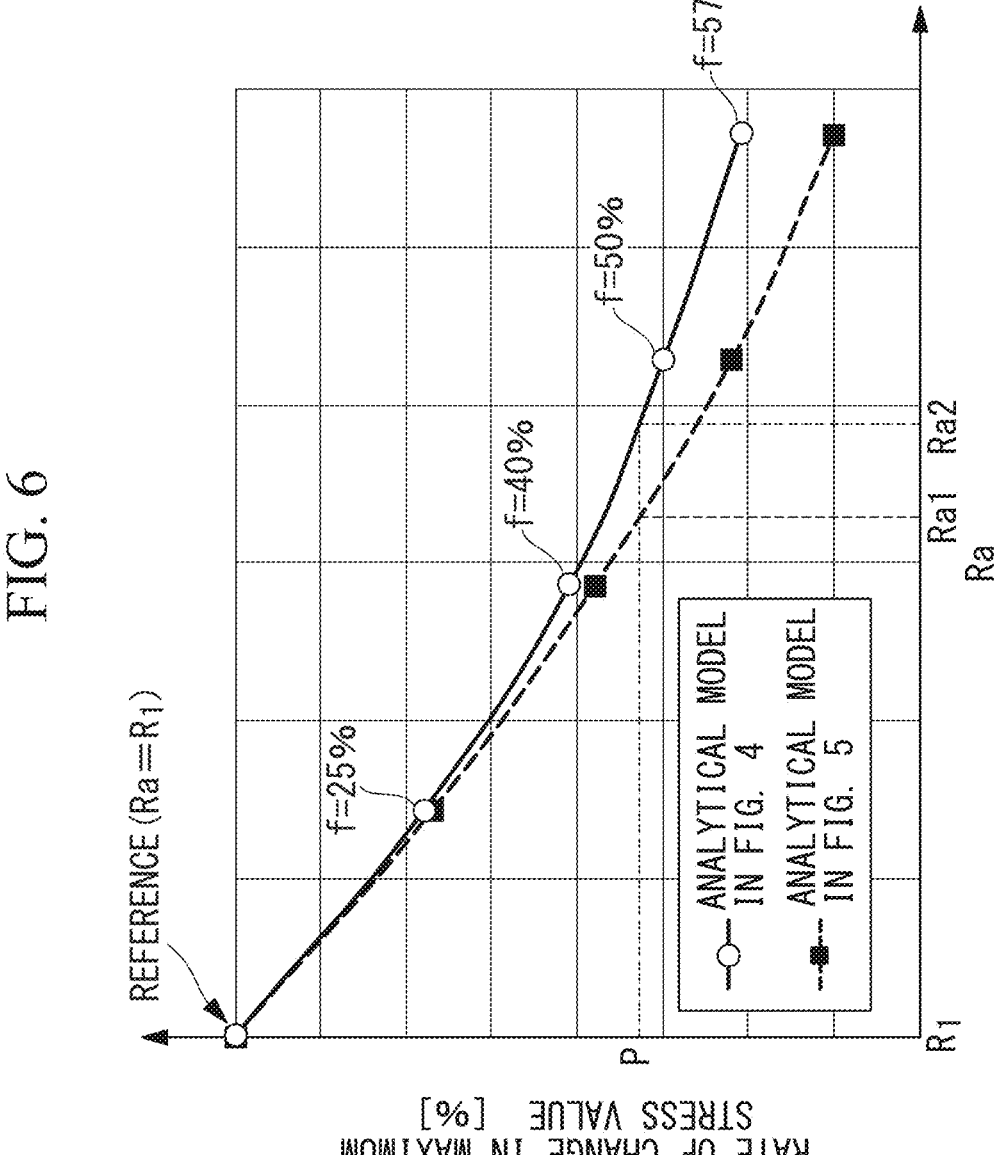
FIG. 6 is a graph illustrating an analytical result with respect to the relationship between the contour shape (minor axis $R=R_1$) of the opposite side surfaces of the connecting beam part in FIG. 2 and a rate of change in a maximum stress value of the connecting beam part.
Figure 7:
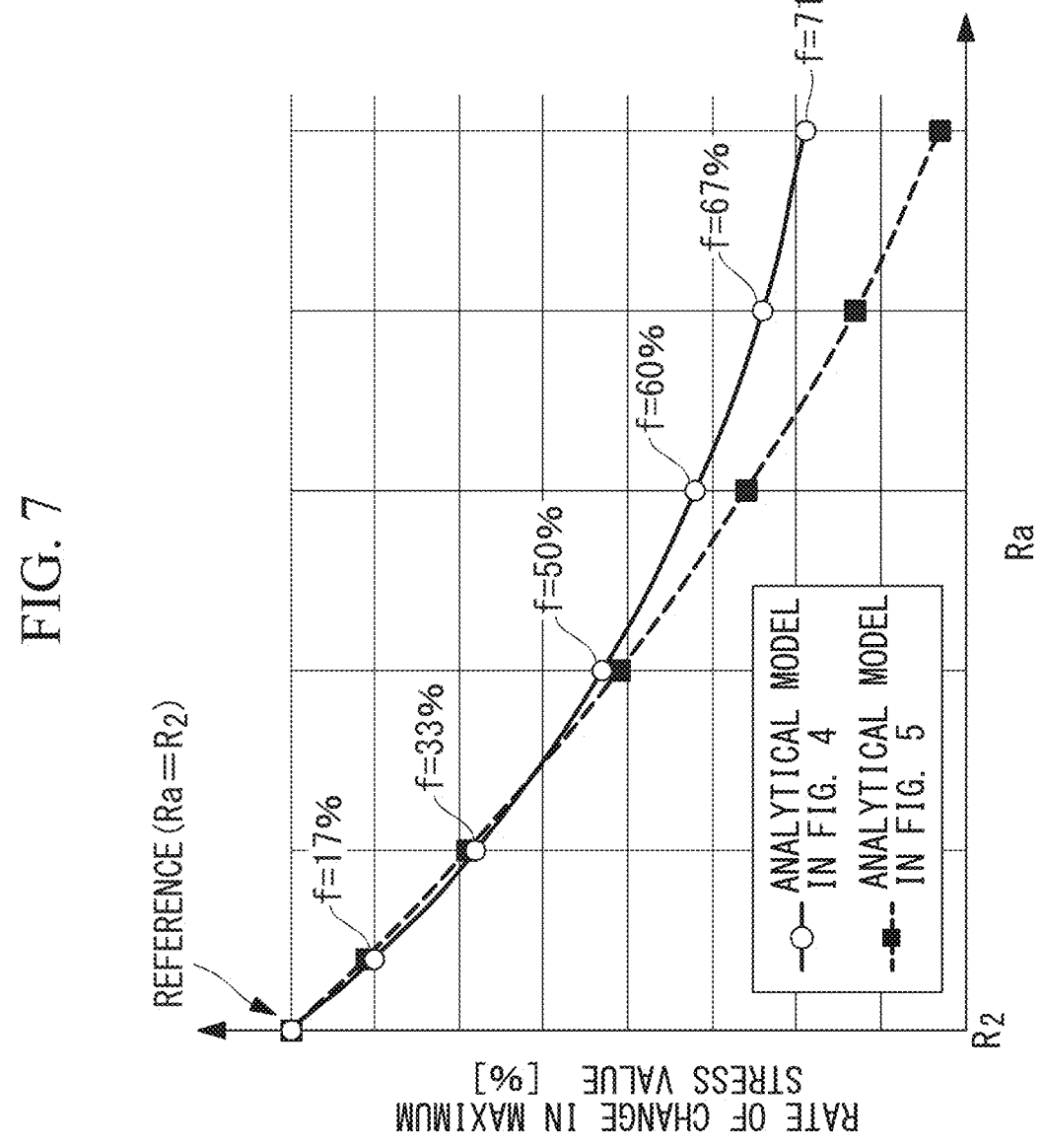
FIG. 7 is a graph illustrating an analytical result with respect to the relationship between the contour shape (minor axis $R=R_2$) of the opposite side surfaces of the connecting beam part in FIG. 2 and the rate of change in the maximum stress value of the connecting beam part.
Figure 8:
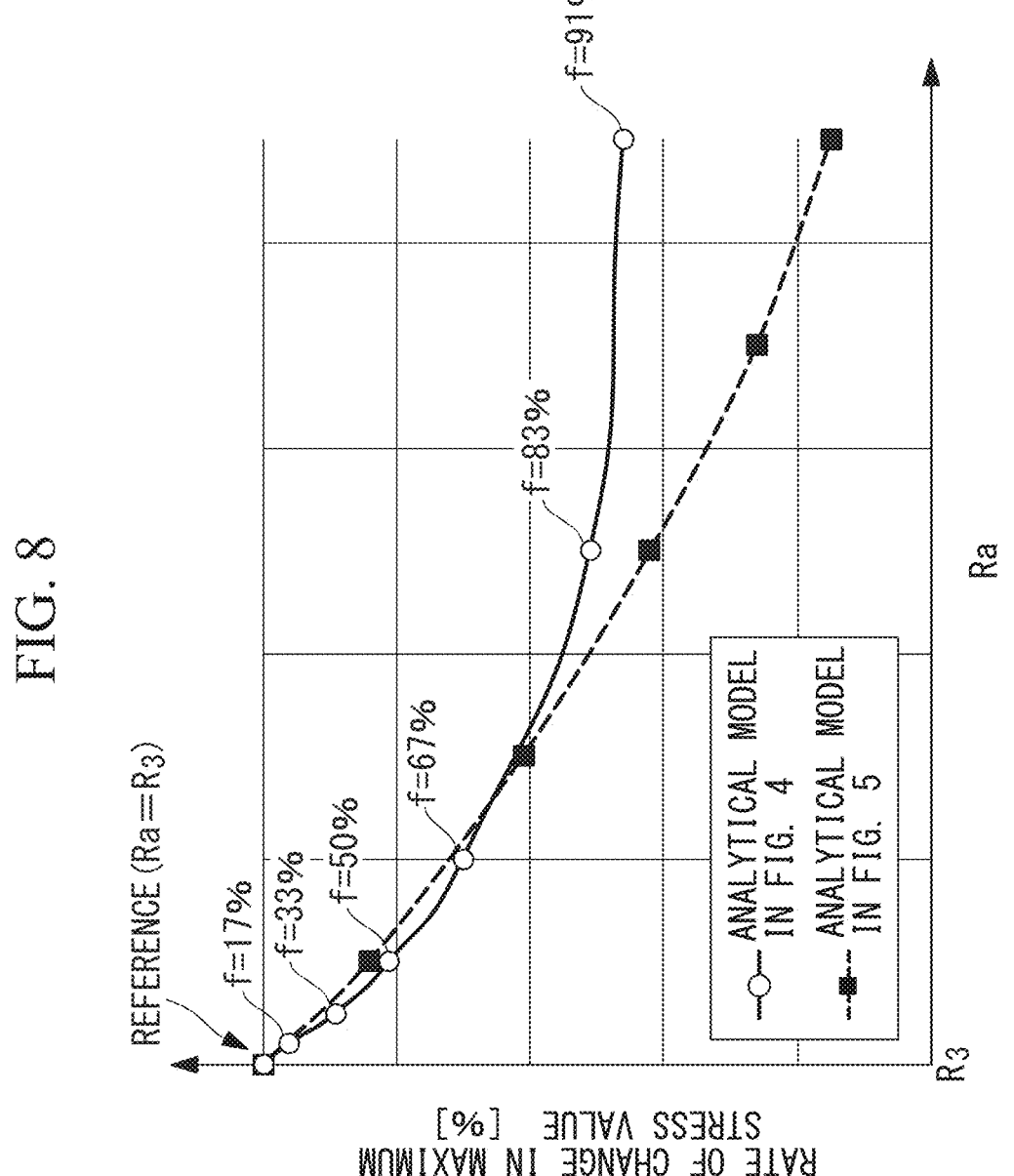
FIG. 8 is a graph illustrating an analytical result with respect to the relationship between the contour shape (minor axis $R=R_3$) of the opposite side surfaces of the connecting beam part in FIG. 2 and the rate of change in the maximum stress value of the connecting beam part.

In each of FIGS. 6 to 8, a rate of change in the maximum stress value is indicated with a solid line in a case where a minor axis R of the elliptical arc in the analytical model in FIG. 4 is fixed at $R_1$, $R_2$, and $R_3$ ($R_1>R_2>R_3$) and a major axis Ra is changed in the direction of the longitudinal axis B. The rate of change in the maximum stress value is indicated with a dash line in a case where a radius Ra in the analytical model in FIG. 5 is changed in correspondence with a change in the major axis Ra in the analytical model in FIG. 4. Likewise, in FIGS. 9 to 11, the rate of change in the amount of deformation of each connecting beam part 4 is compared between the two analytical models.

In FIGS. 6 to 11, the rate of change refers to a value obtained by dividing the maximum stress value or the amount of deformation with respect to the major axis Ra or the radius Ra by the maximum stress value or the amount of deformation when the major axis Ra is set equal to the minor axis R in the analytical model in FIG. 4 or when the radius Ra is set to R in the analytical model in FIG. 5.

According to an analytical result shown in FIG. 6, in order to reduce the maximum stress value occurring in each connecting beam part 4 to a predetermined percentage P, the radius Ra needs to be increased from R ($=R_1$) to Ra1 in the case of the analytical model in FIG. 5. On the other hand, in the case of the analytical model in FIG. 4, it is apparent that only the major axis Ra has to be increased to Ra2, which is greater than Ra1, without having to increase the dimension of the minor axis R ($=R_1$).

Accordingly, with the opposite side surfaces 4a of each connecting beam part 4 being given an elliptical-arc contour shape at the opposite ends thereof in the direction of the longitudinal axis B when viewed from the direction of the axis A, stress concentration in the connecting beam part 4 can be reduced without increasing the width, in the direction orthogonal to the longitudinal axis B, of each end of the connecting beam part 4 in the direction of the longitudinal axis B.

Figure 9:
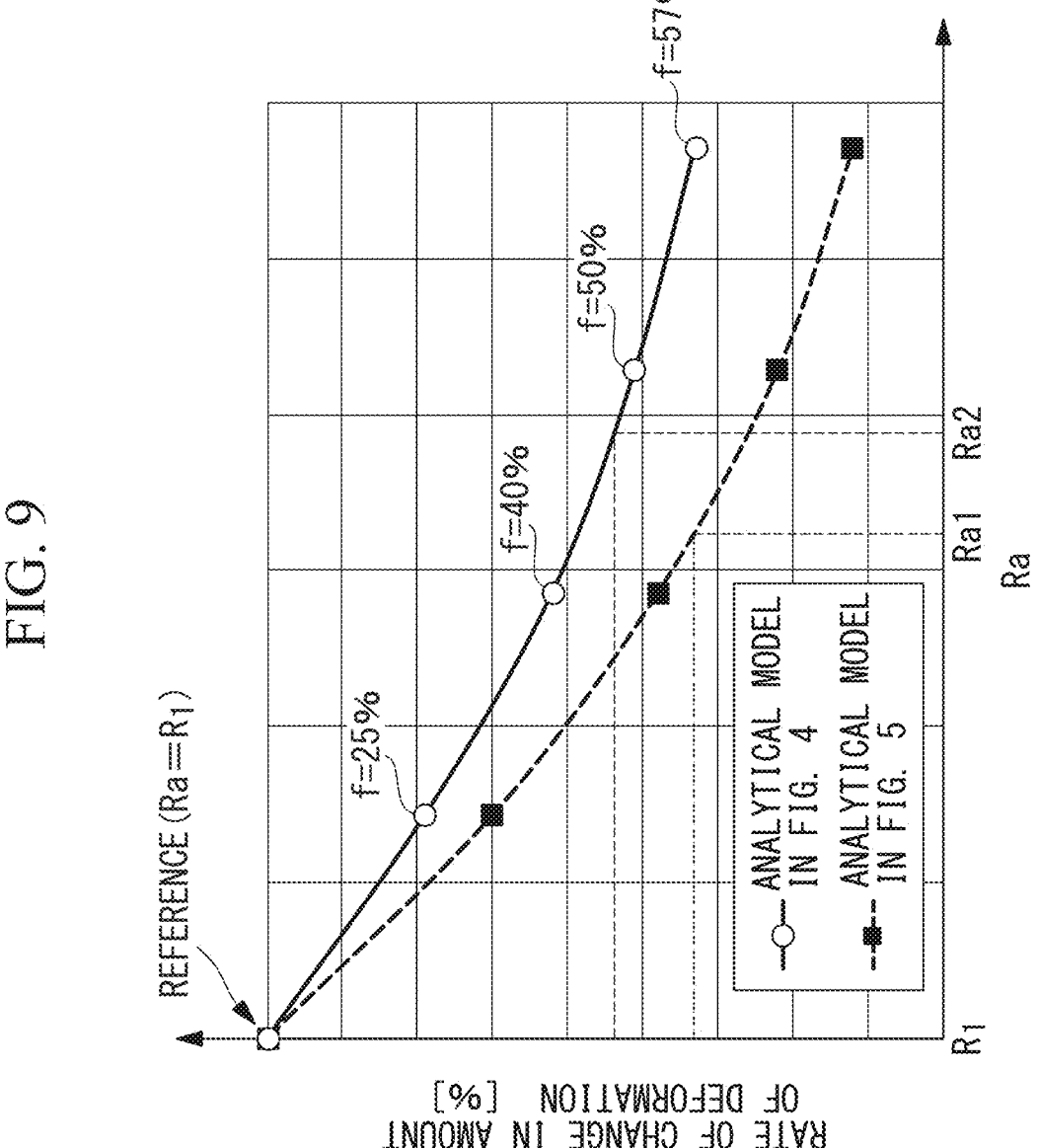
FIG. 9 is a graph illustrating an analytical result with respect to the relationship between the contour shape (minor axis $R=R_1$) of the opposite side surfaces of the connecting beam part in FIG. 2 and a rate of change in an amount of deformation of the connecting beam part.

Furthermore, according to the analytical result shown in FIG. 9, when the minor axis R ($=R_1$) in the analytical model in FIG. 4 is maintained and the major axis Ra is increased to Ra2, the rate of change in the amount of deformation of each connecting beam part 4 is greater than the rate of change in the amount of deformation of each connecting beam part 4 when the radius Ra is increased to Ra1 in the analytical model in FIG. 5.

Specifically, based on a comparison between the analytical model in FIG. 4 and the analytical model in FIG. 5 in which the maximum stress value occurring in each connecting beam part 4 is reduced to the predetermined percentage P, the deformability of the connecting beam part 4 in the circumferential direction is maintained more in the analytical model in FIG. 4, so that an excessive increase in rigidity can be suppressed.

Figure 10:
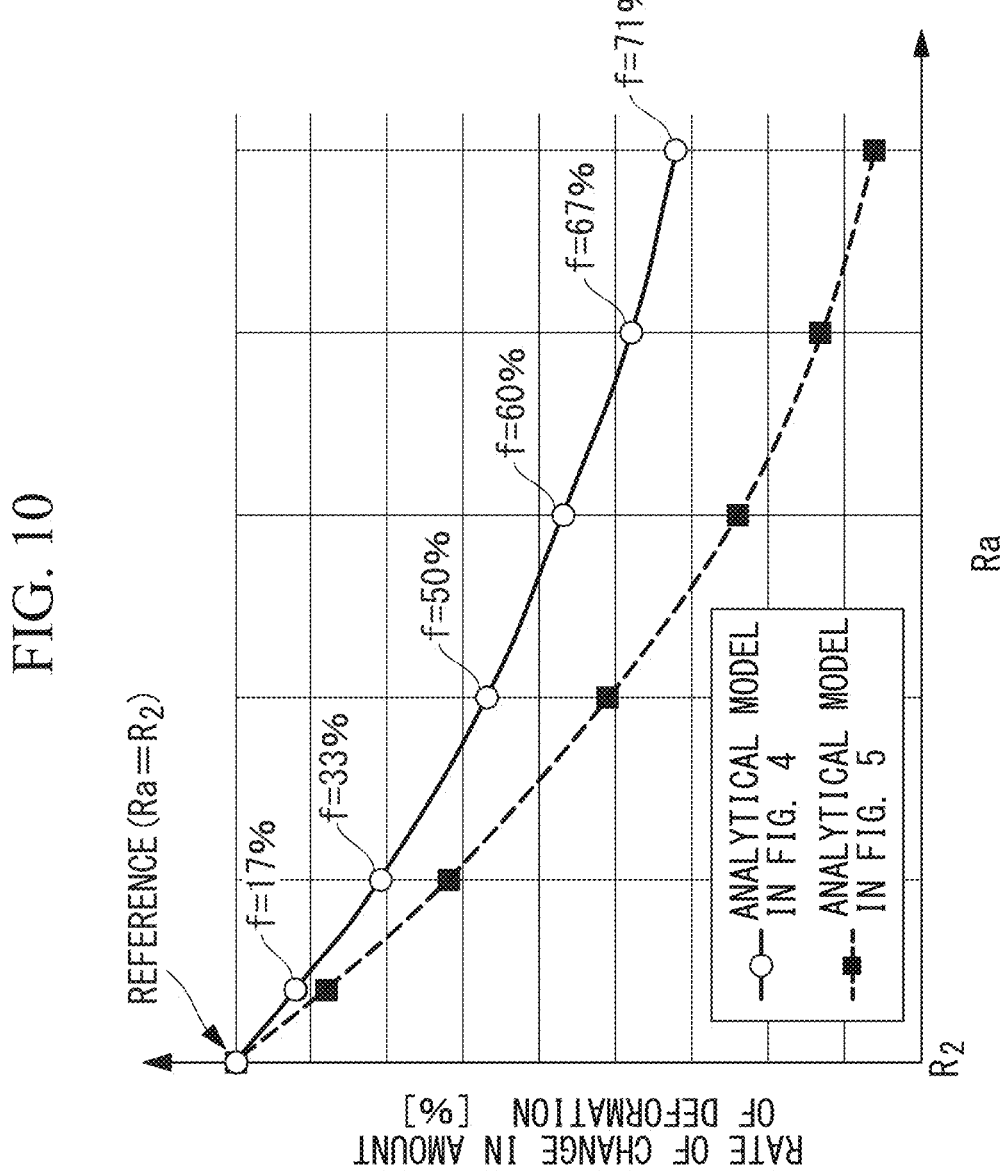
FIG. 10 is a graph illustrating an analytical result with respect to the relationship between the contour shape (minor axis $R=R_2$) of the opposite side surfaces of the connecting beam part in FIG. 2 and the rate of change in the amount of deformation of the connecting beam part.
Figure 11:
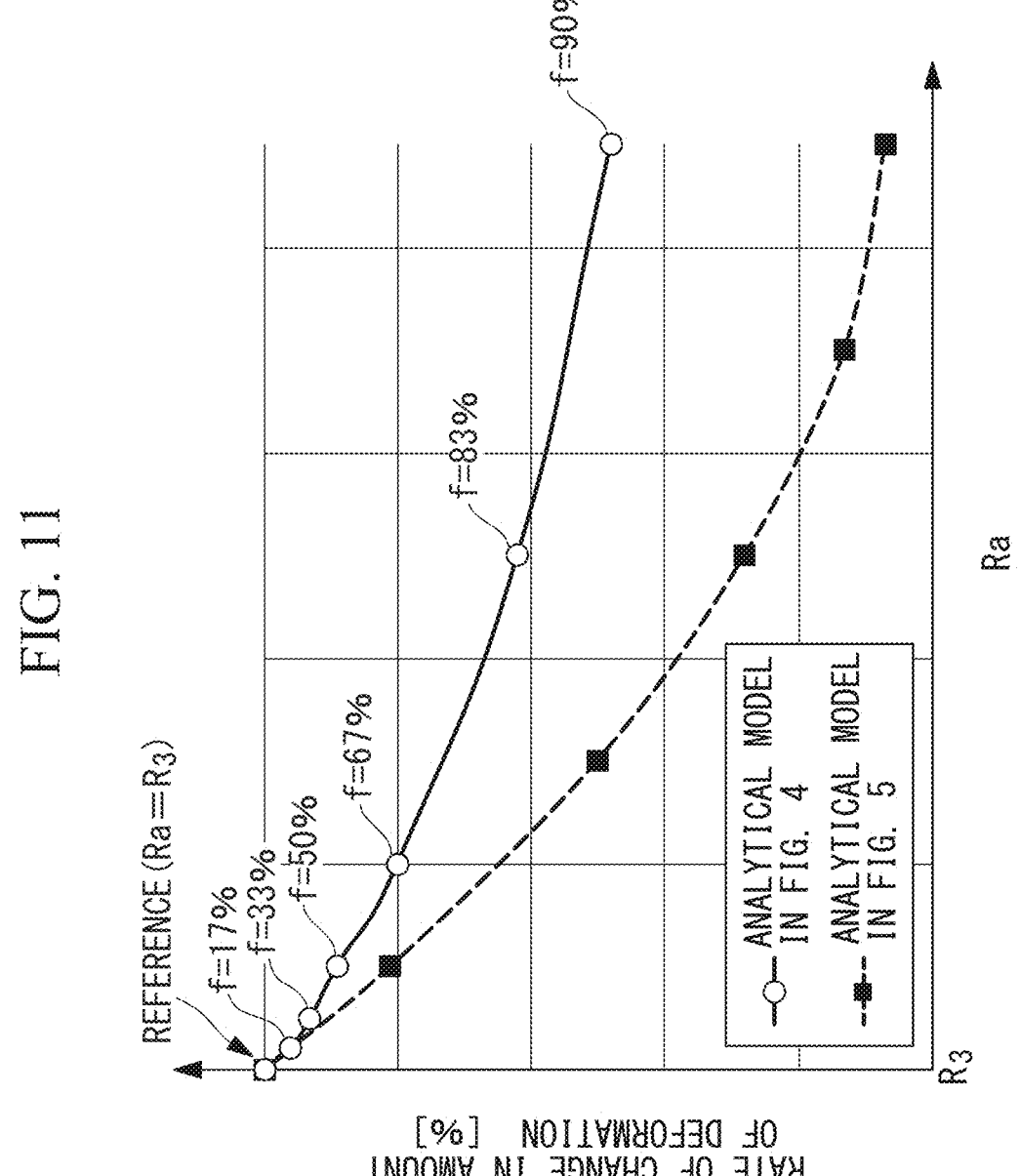
FIG. 11 is a graph illustrating an analytical result with respect to the relationship between the contour shape (minor axis $R=R_3$) of the opposite side surfaces of the connecting beam part in FIG. 2 and the rate of change in the amount of deformation of the connecting beam part.

It is apparent from FIGS. 7 and 10 and from FIGS. 8 and 11 that advantages similar to the above can be achieved.

Accordingly, in the torque sensor 1 according to this embodiment, when torque acts in the circumferential direction between the outer circumferential part 2 and the inner circumferential part 3, relative shifting of the two parts in the circumferential direction can be reduced, and stress concentration occurring in each connecting beam part 4 can be reduced while the amount of deformation of each detecting beam part 5 can be further maintained.

Consequently, the torque sensor 1 according to this embodiment is advantageous in that it can minimize a decrease in torque detection sensitivity while increasing the strength of the connecting beam parts 4.

Similar to FIGS. 6 to 11, FIGS. 12 to 14 illustrate a ratio of the rate of change in the maximum stress value to the rate of change in the amount of deformation of each connecting beam part 4 when the major axis Ra or the radius Ra is changed in the corresponding one of the two analytical models.

Figure 12:
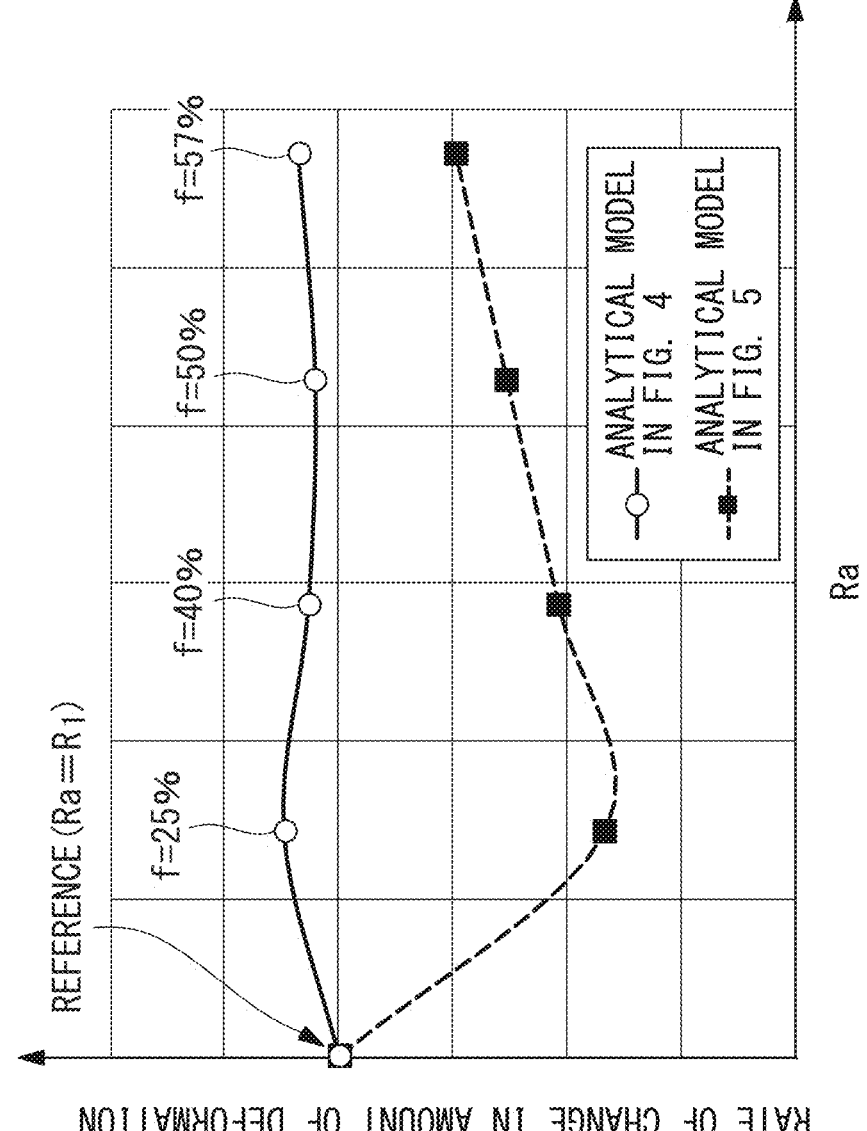
FIG. 12 is a graph illustrating the contour shape (minor axis $R=R_1$) of the opposite side surfaces of the connecting beam part in FIG. 2 and a ratio between the rate of change in the maximum stress value and the rate of change in the amount of deformation.

As shown in FIG. 12, in the analytical model in FIG. 4, when only the major axis Ra of the elliptical arc is increased to increase an ellipticity f to 57%, the rate of change in the amount of deformation of each connecting beam part 4 and the rate of change in the maximum stress value change at about the same ratio. In contrast, in the analytical model in FIG. 5, when the radius Ra is increased, the rate of change in the amount of deformation is much greater than the rate of change in the maximum stress value.

Figure 13:
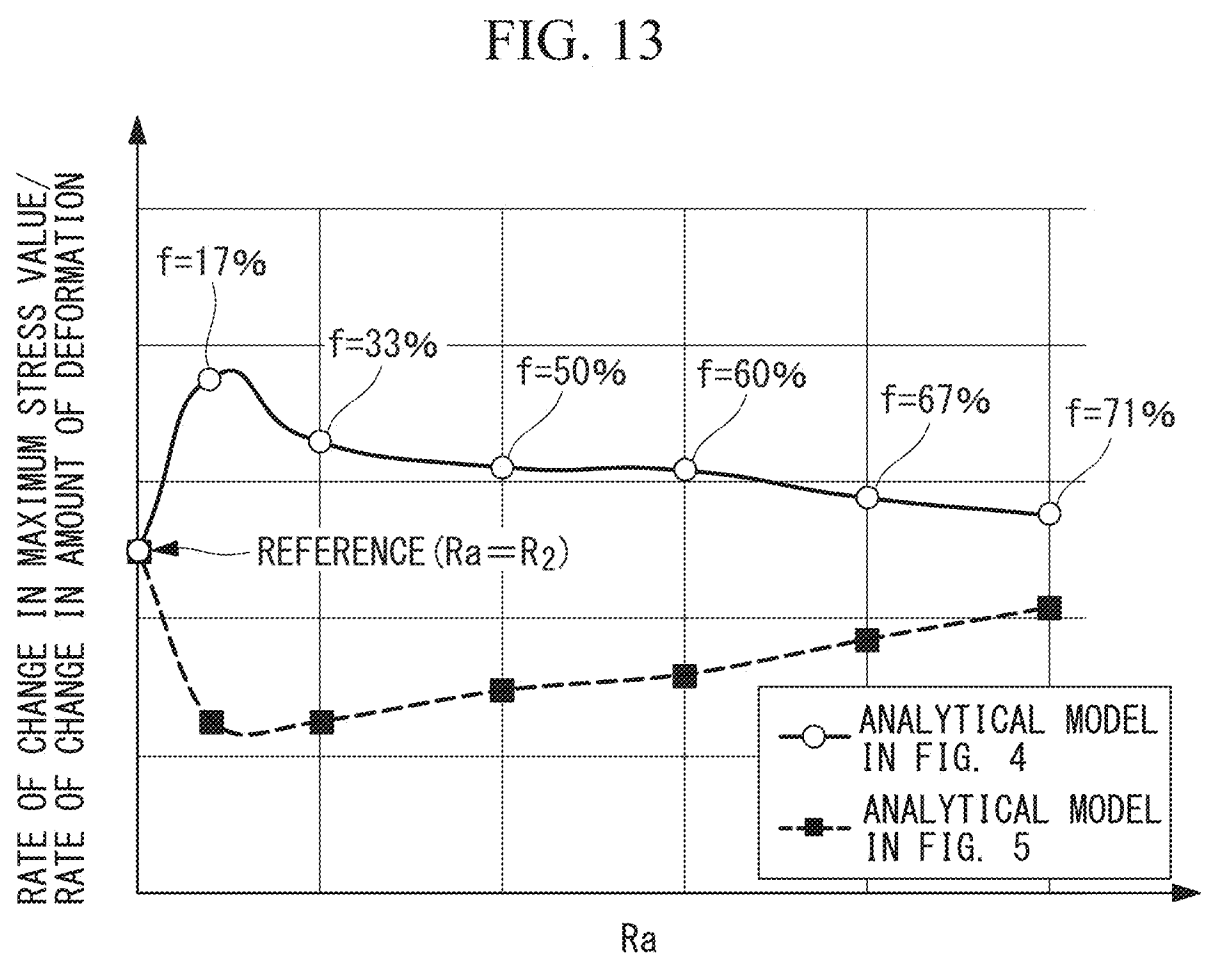
Figure 14:
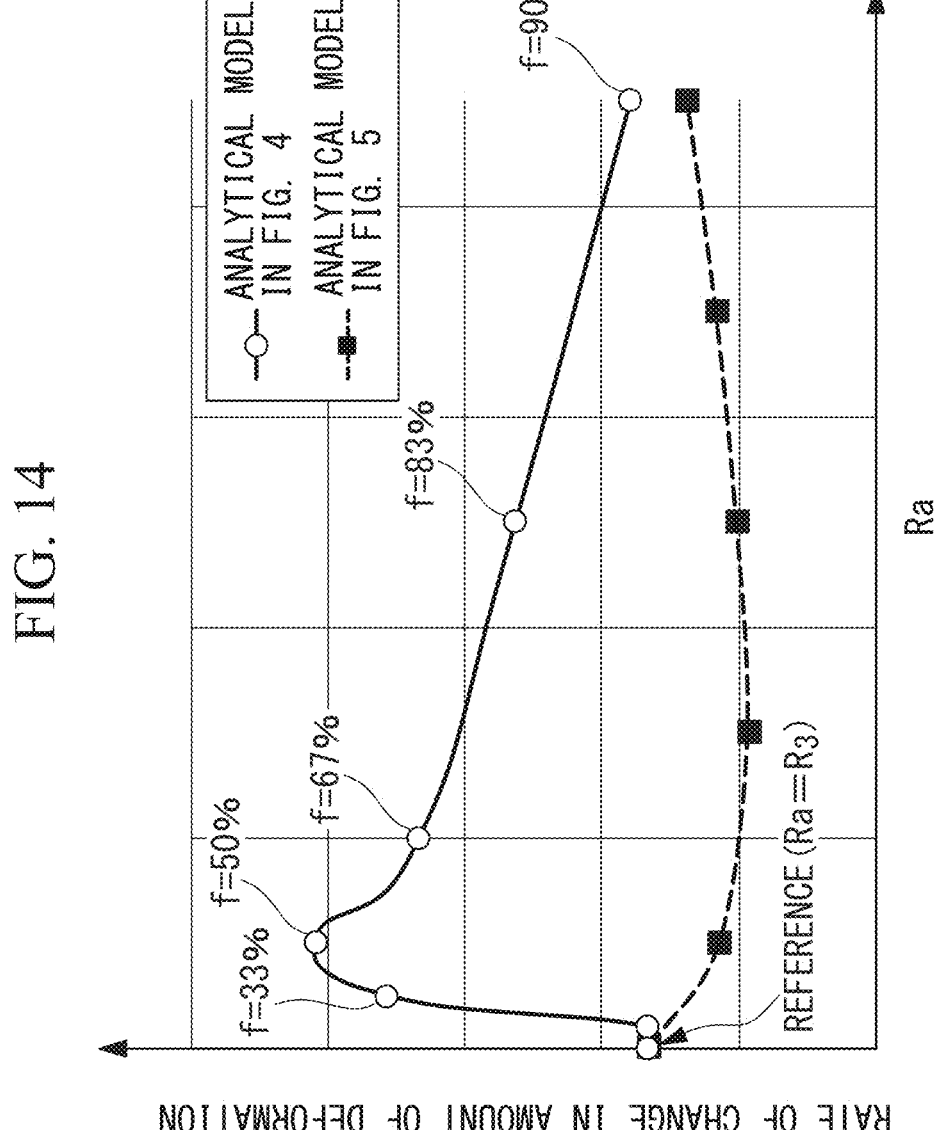
FIG. 14 is a graph illustrating the contour shape (minor axis $R=R_3$) of the opposite side surfaces of the connecting beam part in FIG. 2 and the ratio between the rate of change in the maximum stress value and the rate of change in the amount of deformation.

Likewise, in FIGS. 13 and 14, in a range in which the ellipticity f of the elliptical arc in the analytical model in FIG. 4 is greater than 0% and smaller than or equal to 57%, the rate of change in the amount of deformation of each connecting beam part 4 is much greater than the rate of change in the maximum stress value, as compared with the analytical model in FIG. 5.

According to these results, with the opposite side surfaces 4a of each connecting beam part 4 being given an elliptical-arc contour shape at the opposite ends thereof in the direction of the longitudinal axis B when viewed from the direction of the axis A, stress concentration in the connecting beam part 4 can be alleviated while an excessive increase in rigidity in the circumferential direction of the connecting beam part 4 can be suppressed regardless of the value of the ellipticity f.

In this case, in the analytical model in FIG. 4, the ellipticity f of the elliptical arc preferably ranges between 0% and 57% inclusive, and more preferably ranges between 20% and 55% inclusive.

Figure 15:
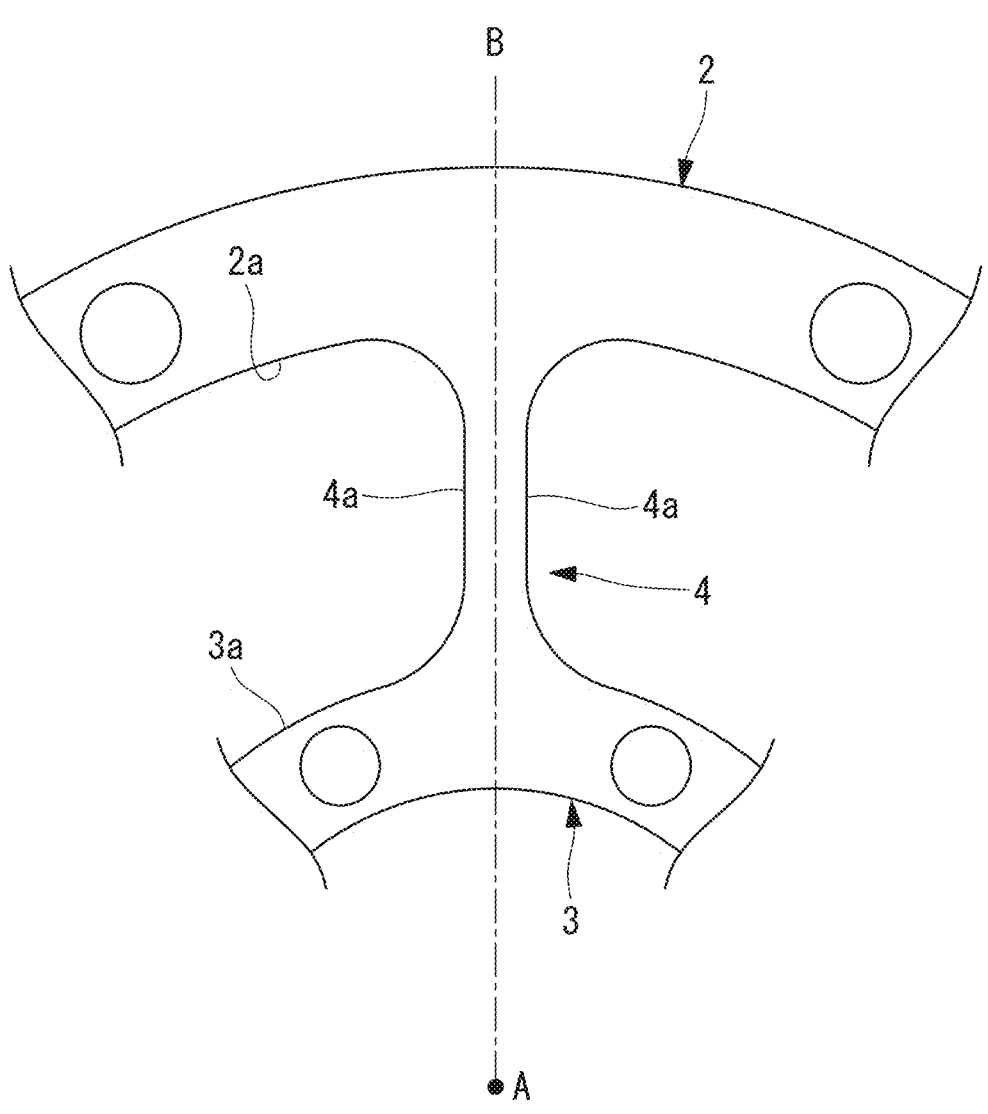
FIG. 15 is a partially enlarged view illustrating a connecting beam part according to a first modification of the torque sensor in FIG. 1.

In this embodiment, the contour shape of each side surface 4a of the connecting beam part 4 as viewed from the direction of the axis A is an elliptical arc corresponding to half of an ellipse with its major axis disposed parallel to the longitudinal axis B. Alternatively, as shown in FIG. 15, the contour shape of each side surface 4a of the connecting beam part 4 as viewed from the direction of the axis A may be constituted of a line extending parallel to the longitudinal axis B at the center in the direction of the longitudinal axis B and an elliptical arc with its major axis extending parallel to the longitudinal axis B at each end in the direction of the longitudinal axis B.

Accordingly, at each side surface 4a of the connecting beam part 4, only a minimum region at each end, in the direction of the longitudinal axis B, where stress tends to concentrate the most has an elliptical-arc curved contour shape when viewed from the direction of the axis A. Accordingly, stress concentration occurring in the connecting beam part 4 can be reduced, while an increase in rigidity in the circumferential direction around the axis A of the connecting beam part 4 can be further minimized.

In this embodiment, when viewed from the direction of the axis A, each side surface 4a of the connecting beam part 4 may have different contour shapes at the opposite ends in the direction of the longitudinal axis B.

Accordingly, for example, if it is predicted that the distribution of stress occurring at the opposite ends of the connecting beam part 4 in the direction of the longitudinal axis B is not uniform, the opposite ends of each side surface 4a of the connecting beam part 4 in the direction of the longitudinal axis B can be set to optimal curved shapes in accordance with the predicted stress distribution.

Figure 16:
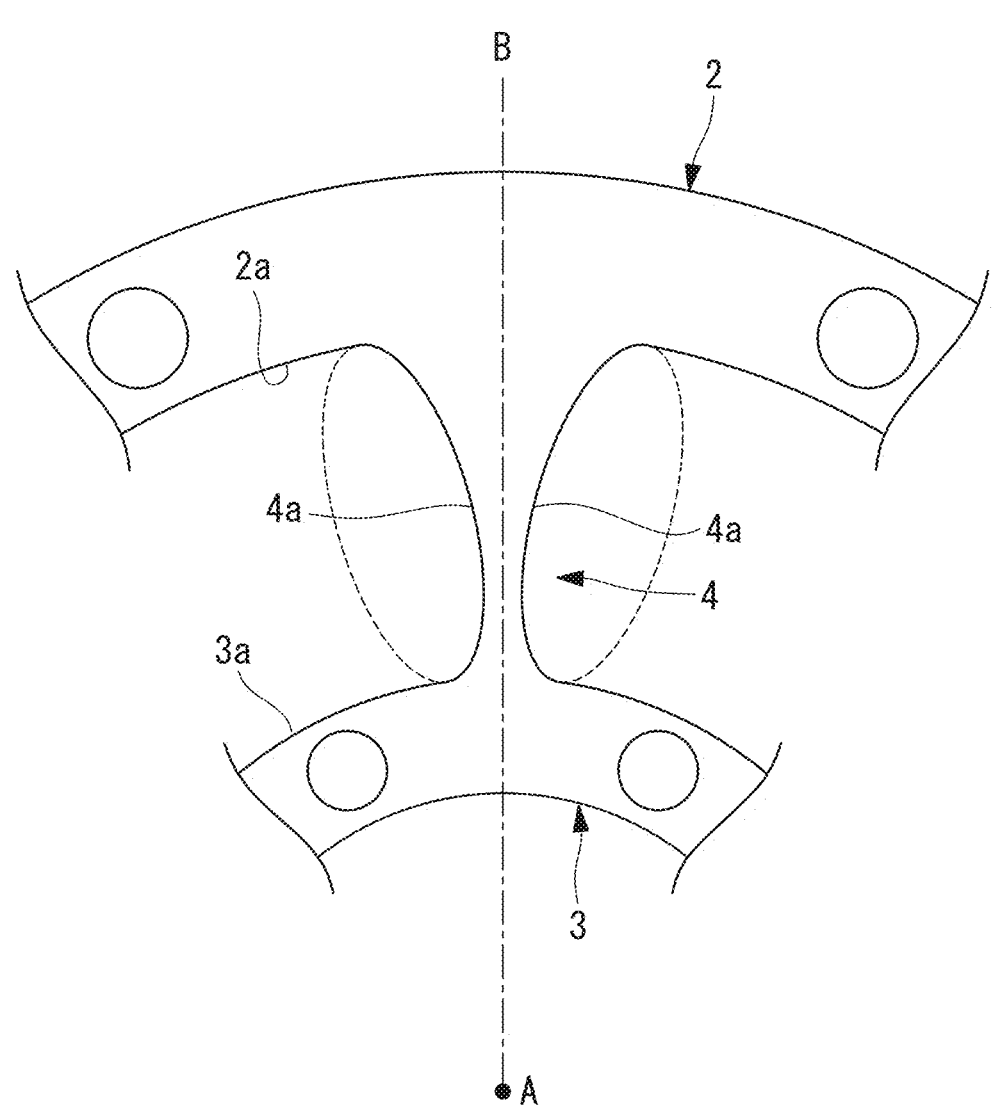
FIG. 16 is a partially enlarged view illustrating a connecting beam part according to a second modification of the torque sensor in FIG. 1.

As shown in FIG. 16, in this embodiment, the contour shape of each side surface 4*a* of the connecting beam part 4 as viewed from the direction of the axis A may be constituted of a portion of an elliptical arc with its major axis disposed in a direction inclined relative to the longitudinal axis B.

As an alternative to this embodiment in which four connecting beam parts 4 are provided, two, three, or five or more connecting beam parts 4 may be provided.

As an alternative to this embodiment in which the detecting beam parts 5 are parts of the sensor body 10, the detecting beam parts 5 may be provided separately from the sensor body 10 and may be fixed in the radial direction between the outer circumferential part 2 and the inner circumferential part 3 by using, for example, bolts.

As an alternative to this embodiment in which the strain gauges 20 are bonded to the surfaces of the detecting beam parts 5, each strain gauge 20 may be bonded to the surface of the corresponding connecting beam part 4. In this case, the detecting beam parts 5 can be omitted, so that the torque sensor 1 can have a more simplified configuration.

Although the strain gauges 20 as components for detecting the amount of deformation of the detecting beam parts 5 are of an electrical-resistance type, the strain gauges 20 used are not limited to this type and may be sensors of another arbitrary type, such as capacitance sensors, optical sensors, or magnetostrictive sensors.

For example, if capacitance sensors are used, a pair of electrodes disposed facing each other may be configured to change the distance between the electrodes or the opposing area therebetween in accordance with torque acting in the circumferential direction between the outer circumferential part 2 and the inner circumferential part 3.

As an alternative to this embodiment in which each side surface 4*a* of the connecting beam part 4 has an elliptical-arc contour shape when viewed from the direction of the axis A, each side surface 4*a* may have an arbitrary concave-curved shape whose radius of curvature gradually increases from the opposite ends of the connecting beam part 4 toward the center thereof in the direction of the longitudinal axis B.

The invention claimed is:

1. A torque sensor comprising:
an annular outer circumferential part and an annular inner circumferential part that are disposed concentrically with a gap therebetween in a radial direction;
a plurality of double-supported-beam-like connecting beam parts disposed with a gap therebetween in a circumferential direction and connecting the outer circumferential part and the inner circumferential part to each other; and
a detecting part that detects torque applied around a center axis between the outer circumferential part and the inner circumferential part,
wherein, when viewed from a direction of the center axis, opposite side surfaces of each connecting beam part in the circumferential direction each have a concave curved shape with a radius of curvature that gradually increases from an inner circumferential surface of the outer circumferential part and an outer circumferential surface of the inner circumferential part toward a center in a length direction of the connecting beam part,
wherein the curved shape is constituted of a portion of an ellipse whose major axis is disposed parallel to the length direction of the connecting beam part, and
wherein the ellipse has an ellipticity that is greater than 0% and smaller than or equal to 57%.

2. The torque sensor according to claim 1, wherein the curved shape belonging to each side surface of the connecting beam part in the circumferential direction and extending from the outer circumferential part to the inner circumferential part is constituted of a portion of a single ellipse.

3. The torque sensor according to claim 1, wherein, in each side surface of the connecting beam part in the circumferential direction, the curved shape extending from the inner circumferential surface of the outer circumferential part toward the center in the length direction of the connecting beam part and the curved shape extending from the outer circumferential surface of the inner circumferential part toward the center in the length direction of the connecting beam part are different from each other.

4. The torque sensor according to claim 1, wherein the ellipse has an ellipticity that ranges between 20% and 55% inclusive.

* * * * *